United States Patent
Suzuki et al.

(10) Patent No.: US 11,209,542 B2
(45) Date of Patent: Dec. 28, 2021

(54) OBJECT DETECTION DEVICE

(71) Applicant: DENSO CORPORATION, Kariya (JP)

(72) Inventors: Yohei Suzuki, Nisshin (JP); Taketo Harada, Nisshin (JP); Mitsuyasu Matsuura, Nisshin (JP); Takuya Nomura, Kariya (JP)

(73) Assignee: DENSO CORPORATION, Kariya (JP)

(*) Notice: Subject to any disclaimer, the term of this patent is extended or adjusted under 35 U.S.C. 154(b) by 114 days.

(21) Appl. No.: 16/595,778

(22) Filed: Oct. 8, 2019

(65) Prior Publication Data

US 2020/0049816 A1    Feb. 13, 2020

Related U.S. Application Data

(63) Continuation of application No. PCT/JP2018/014559, filed on Apr. 5, 2018.

(30) Foreign Application Priority Data

Apr. 10, 2017 (JP) .............................. JP2017-077635

(51) Int. Cl.
  *G01S 15/12* (2006.01)
  *G01S 15/93* (2020.01)
  *G01S 15/931* (2020.01)

(52) U.S. Cl.
  CPC ............ *G01S 15/12* (2013.01); *G01S 15/931* (2013.01)

(58) Field of Classification Search
  CPC ...... G01S 15/12; G01S 15/931; G01S 15/104; G01S 7/523; G01S 15/003
  USPC ........................................................... 367/99
  See application file for complete search history.

(56) References Cited

U.S. PATENT DOCUMENTS 5,965,847 A    10/1999    Tanaka et al.

FOREIGN PATENT DOCUMENTS

| DE | 10106142 A1 | 8/2002 |
| EP | 1126548 A2 | 8/2001 |
| JP | H07181258 A | 7/1995 |
| JP | 2002277545 A | 9/2002 |
| JP | 2015184235 A | 10/2015 |

*Primary Examiner* — Daniel L Murphy
(74) *Attorney, Agent, or Firm* — Maschoff Brennan

(57) ABSTRACT

An object detection device which determines an amplitude $A_r$ of an ultrasonic wave received by a receiving unit, detects a frequency $f_r$ of the ultrasonic wave, sweeps a frequency $f_p$ of a pulse signal after a predetermined time has elapsed from start of generation of the pulse signal, and determines that the received ultrasonic wave is a reflected wave of the probe wave when the frequency $f_r$ after the amplitude $A_r$ becomes a predetermined reference value or more from start of transmission of the probe wave makes the same change as the frequency $f_p$. When an ultrasonic wave received by a receiver is determined to be a reflected wave of the probe wave, the object detection unit calculates a distance to an object based on a time from transmission of the probe wave to reception of the ultrasonic wave.

17 Claims, 14 Drawing Sheets

FIG.26
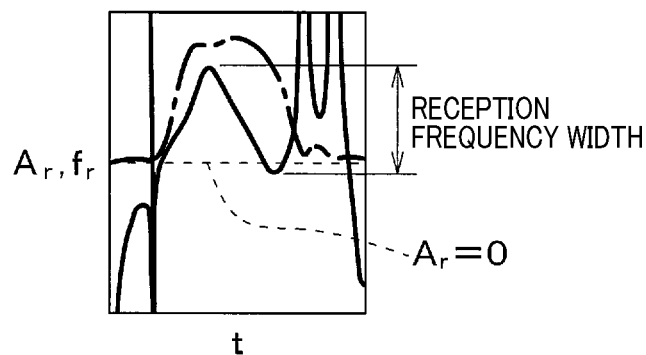
FIG.27
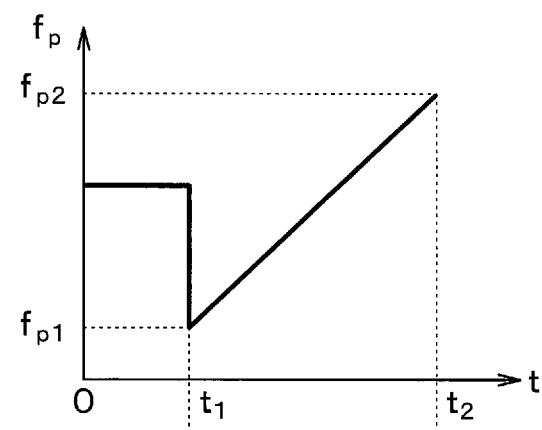
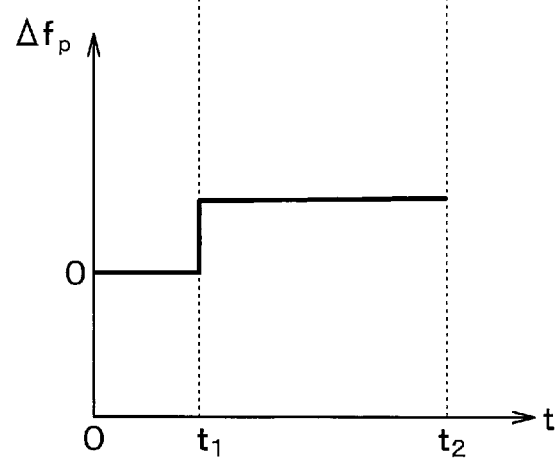

OBJECT DETECTION DEVICE

CROSS-REFERENCE TO RELATED APPLICATION

This application is based on and claims the benefit of priority from earlier Japanese Patent Application No. 2017-77635 filed Apr. 10, 2017, the description of which is incorporated herein by reference.

TECHNICAL FIELD

The present disclosure relates to an object detection device.

BACKGROUND ART

Conventionally, there has been proposed an object detection device that includes an ultrasonic sensor having a transmission unit for transmitting an ultrasonic wave and a receiving unit for receiving an ultrasonic wave and calculates a distance to an object based on a time from transmission of the ultrasonic wave to reception of a reflected wave. If such an object detection device is mounted on a vehicle or the like and used for obstacle detection, there is risk that detection accuracy of the object may be reduced due to interference with an ultrasonic signal emitted by surrounding vehicles.

For example, a resonant microphone is used as a transmission unit and a receiving unit. In an ultrasonic sensor using such a resonant microphone, sound pressures of a transmission wave and a received wave are large, and a frequency of the received wave is observed only in a narrow frequency band near a resonant frequency of the microphone.

Further, the present inventors have found out that in an ultrasonic sensor including a resonant microphone, change of a frequency of the received wave is less likely to be observed immediately after a reflected wave of the ultrasonic wave has reached a receiving unit. This is because it is thought that in a system using resonance of the resonant microphone or the like, rise of amplitude just after the start of driving of the transmission unit is slow.

Therefore, if such an ultrasonic sensor is used with a conventional object detection system, a detectable frequency range of the received wave will be narrow, and detection of a chirp signal and discrimination of the ultrasonic wave will be difficult.

In view of the above points, the present disclosure has an object to provide an object detection device capable of facilitating discrimination of an ultrasonic wave.

In order to achieve the above object, according to one aspect of the present disclosure, an object detection device includes: (a) a signal generating unit that generates a pulse signal of a frequency $f_p$; (b) a transmission unit that converts the pulse signal into a probe wave being an ultrasonic wave and transmits the probe wave; a receiving unit that receives an ultrasonic wave; a distance calculating unit that calculates a distance to an object based on a time from transmission of the probe wave by the transmission unit to reception of a reflected wave of the probe wave by the receiving unit; (b) a determination unit that determines whether an ultrasonic wave received by the receiving unit is a reflected wave of the probe wave; (c) an amplitude detecting unit that detects an amplitude $A_r$ of the ultrasonic wave received by the receiving unit; and (d) a frequency detecting unit that detects a frequency $f_r$ of the ultrasonic wave received by the receiving unit, in which the signal generating unit sweeps the frequency $f_p$ after a predetermined time has elapsed from start of generation of the pulse signal. The determination unit determines that the ultrasonic wave received by the receiving unit is a reflected wave of the probe wave when the frequency $f_r$ after the amplitude $A_r$ becomes equal to or more than a predetermined reference value from start of transmission of the probe wave by the transmission unit makes the same change as the frequency $f_p$. The distance calculating unit, when the determination unit determines that an ultrasonic wave received by the receiving unit is a reflected wave of the probe wave, calculates a distance to an object based on a time from transmission of the probe wave by the transmission unit to reception of the ultrasonic wave by the receiving unit.

As described above, sweeping of the frequency $f_p$ is initiated after a predetermined time has elapsed from start of generation of the pulse signal and the amplitude of the probe wave becomes large, thereby increasing the sweep range of the frequency $f_p$ after the amplitude becomes large. This widens the change bandwidth of the frequency $f_r$ of the received wave after the amplitude $A_r$ becomes large. Therefore, when determination of the frequency is performed on the received wave after the amplitude $A_r$ becomes large and change of the frequency $f_r$ becomes easily observed, detection of the chirp signal and discrimination of the ultrasonic wave will be easy.

In addition, according to another aspect, an object detection device includes: (a) a signal generating unit that generates a pulse signal of a frequency $f_p$; (b) a transmission unit that converts the pulse signal into a probe wave being an ultrasonic wave and transmits the probe wave; (c) a receiving unit that receives an ultrasonic wave; (d) a distance calculating unit that calculates a distance to an object based on a time from transmission of the probe wave by the transmission unit to reception of a reflected wave of the probe wave by the receiving unit; (e) a determination unit that determines whether an ultrasonic wave received by the receiving unit is a reflected wave of the probe wave; (f) an amplitude detecting unit that detects an amplitude $A_r$ of the ultrasonic wave received by the receiving unit; and (g) a frequency detecting unit that detects a frequency $f_r$ of the ultrasonic wave received by the receiving unit. When an amplitude of the probe wave is defined as $A_t$, the transmission unit has a characteristic that the amplitude $A_t$ will be a predetermined reference value $A_{t1}$ or more when the pulse signal is continuously input at a frequency included in a predetermined range. The signal generating unit generates the pulse signal so that the amplitude $A_t$ will have the reference value $A_{t1}$ or more when a predetermined time has elapsed from start of generation of the pulse signal and sweeps the frequency $f_p$ from the minimum value to the maximum value or from the maximum value to the minimum value in the predetermined range after the predetermined time has elapsed from start of generation of the pulse signal. The determination unit determines that the ultrasonic wave received by the receiving unit is a reflected wave of the probe wave when the frequency $f_r$ makes the same change as the frequency $f_p$. When the determination unit determines that an ultrasonic wave received by the receiving unit is a reflected wave of the probe wave, the distance calculating unit calculates a distance to an object based on a time from transmission of the probe wave by the transmission unit to reception of the ultrasonic wave by the receiving unit.

As described above, sweeping of the frequency $f_p$ is performed from the minimum value to the maximum value or from the maximum value to the minimum value in the predetermined range after the amplitude $A_t$ of the probe wave becomes the reference value $A_{t1}$ or more, and thereby the sweep bandwidth of the frequency $f_p$ becomes wide after the amplitude $A_t$ becomes large. This widens the change bandwidth of the frequency $f_r$ of the received wave after the amplitude $A_r$ becomes large. Therefore, when determination of the frequency is performed on the received wave after the amplitude $A_r$ becomes large and change of the frequency $f_r$ becomes easily observed, detection of the chirp signal and discrimination of the ultrasonic wave will be easy.

In addition, according to another aspect, an object detection device includes: (a) a signal generating unit that generates a pulse signal; a transmission unit that converts the pulse signal into a probe wave being an ultrasonic wave and transmits the probe wave; (b) a receiving unit that receives an ultrasonic wave; (c) a distance calculating unit that calculates a distance to an object based on a time from transmission of the probe wave by the transmission unit to reception of a reflected wave of the probe wave by the receiving unit; (d) a determination unit that determines whether an ultrasonic wave received by the receiving unit is a reflected wave of the probe wave; and (e) a frequency detecting unit that detects a frequency of the ultrasonic wave received by the receiving unit. The pulse signal includes a first pulse signal (SA) and a second pulse signal (SB). The signal generating unit sweeps frequencies of the first pulse signal and the second pulse signal while the transmission unit transmits the probe wave. Conditions of $f_{As} < f_{Ae}$, $f_{Be} < f_{Bs}$, $f_{As} < f_{Bs}$, and $f_{Be} < f_{Ae}$ are satisfied wherein $f_{As}$ is a frequency of the first pulse signal at start of sweeping, $f_{Ae}$ is a frequency of the first pulse signal at the end of sweeping, $f_{Bs}$ is a frequency of the second pulse signal at start of sweeping, and $f_{Be}$ is a frequency of the second pulse signal at the end of sweeping. The determination unit determines that the ultrasonic wave received by the receiving unit is a reflected wave of the probe wave when the frequency detecting unit detects a plurality of frequencies, and the plurality of frequencies detected by the frequency detecting unit include frequencies making the same change as the frequencies of the first pulse signal and the second pulse signal. When the determination unit determines that an ultrasonic wave received by the receiving unit is a reflected wave of the probe wave, the distance calculating unit calculates the distance to the object based on a time from transmission of the probe wave by the transmission unit to reception of the ultrasonic wave by the receiving unit.

As described above, when $f_{As} < f_{Ae}$, and $f_{Be} < f_{Ae}$ are fulfilled, the sweep bandwidth of each of the first and second pulse signals can be widened compared with a case of $f_{As} < f_{Ae}$ and $f_{Be} = f_{Ae}$. This widens the frequency change bandwidth of the received wave and facilitates detection of the chirp signal and discrimination of the ultrasonic wave.

Note that, the reference numbers with parentheses attached to respective components and the like indicate one example of correspondence relation between the components and the like and specific components and the like described in embodiments described below.

BRIEF DESCRIPTION OF THE DRAWINGS

FIG. 26 is a graph showing time changes of an amplitude and a frequency of a received wave in another embodiment.

FIG. 27 is a graph showing a time change of a frequency of a pulse signal in another embodiment.

DESCRIPTION OF EMBODIMENTS

Embodiments of the present disclosure will be described below with reference to drawings. Note that, in the respective embodiments described below, portions identical or equivalent to each other are attached with the same code and explanation thereof will be given.

First Embodiment

Figure 1:
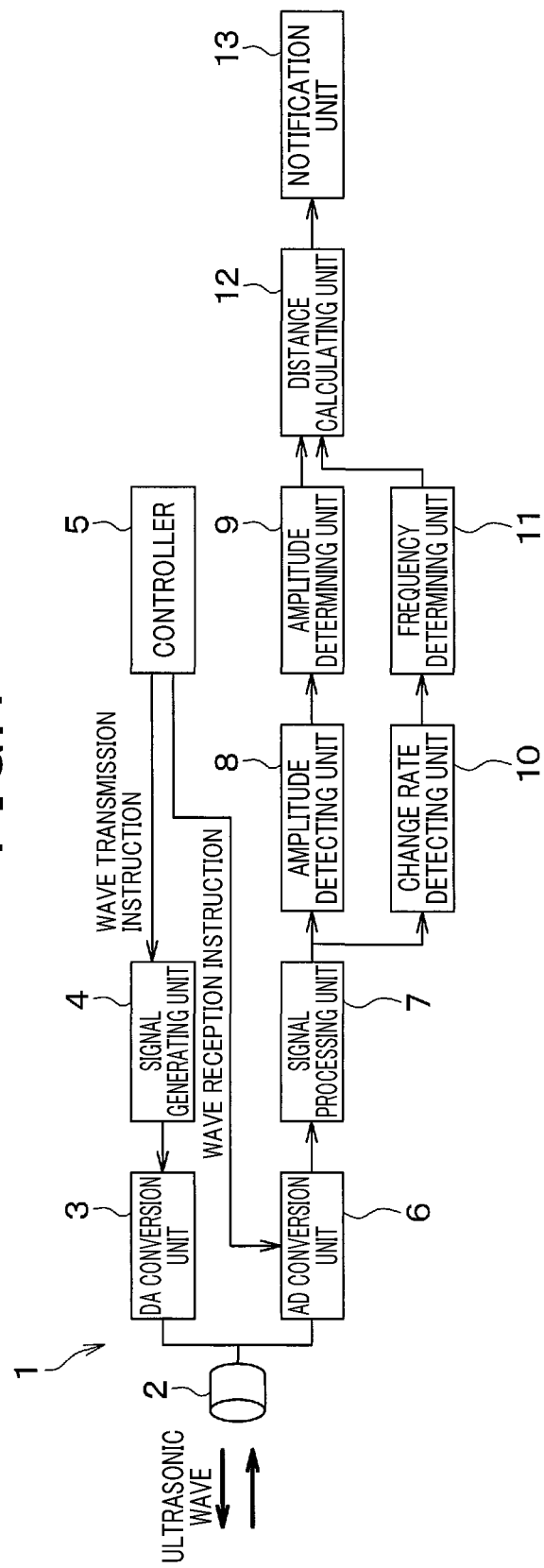
FIG. 1 is a diagram showing an overall configuration of an object detection device according to a first embodiment.

The first embodiment will be described. An object detection device according to the present embodiment is an ultrasonic sonar device for detecting presence of an object around a vehicle and a distance to the object. As shown in FIG. 1, an object detection device 1 includes a microphone 2, a DA conversion unit 3, a signal generating unit 4, and a controller 5. The object detection device 1 further includes an AD conversion unit 6, a signal processing unit 7, an amplitude detecting unit 8, an amplitude determining unit 9, a change rate detecting unit 10, a frequency determining unit 11, a distance calculating unit 12, and a notification unit 13.

The microphone 2 is disposed facing an outer surface of the vehicle and transmits an ultrasonic wave being a probe wave for detecting an object toward outside of the vehicle. Specifically, the microphone 2 includes a piezoelectric device (not shown) of a configuration in which a piezoelectric membrane is disposed between two electrodes facing each other. The electrodes are connected to the DA conversion unit 3, the piezoelectric membrane is deformed upon application of an AC voltage from the DA conversion unit 3 thereto, so that the microphone 2 transmits an ultrasonic wave externally from the vehicle.

In addition, the microphone 2 receives an ultrasonic wave including a reflected wave of the probe wave and outputs a voltage corresponding to a sound pressure of the received ultrasonic wave and corresponds to a receiving unit. The two electrodes of the piezoelectric element included in the microphone 2 are also connected to the AD conversion unit 6, and a voltage between the two electrodes when the ultrasonic wave is received and the piezoelectric membrane deforms is input to the AD conversion unit 6.

The DA conversion unit 3 D/A-converts the input signal and outputs a voltage thus generated. The signal generating unit 4 that generates a pulse signal is connected to the DA conversion unit 3, and the DA conversion unit 3 D/A-converts the pulse signal input from the signal generating unit 4 and applies an AC voltage thus generated to the microphone 2. Thus, the microphone 2 and the DA conversion unit 3 convert the pulse signal generated by the signal generating unit 4 into an ultrasonic wave and transmit it, and correspond to a transmission unit.

The signal generating unit 4 generates a pulse signal according to a wave transmission instruction from the controller 5 and changes a frequency of a pulse signal to be generated. The controller 5 periodically sends the wave transmission instruction to the signal generating unit 4, makes the microphone 2 transmit a probe wave, and also periodically sends a wave reception instruction to the AD conversion unit 6. As described above, the AD conversion unit 6 is configured to receive a voltage between the two electrodes of the piezoelectric element included in the microphone 2, and the AD conversion unit 6 A/D-converts the input voltage according to the wave reception instruction from the controller 5 and outputs a signal thus generated.

The signal processing unit 7 performs FFT (fast Fourier transformation) analysis on the output signal of the AD conversion unit 6 to detect a frequency component included in the received wave and corresponds to a frequency detecting unit. The signal processing unit 7 converts the frequency component detected by the FFT analysis into a signal and outputs it.

The amplitude detecting unit 8 detects an amplitude of the received wave from the output signal of the signal processing unit 7. The amplitude determining unit 9 determines whether the amplitude detected by the amplitude detecting unit 8 is equal to or more than a predetermined reference value and transmits a signal corresponding to the determination result to the distance calculating unit 12.

The change rate detecting unit 10 determines a change rate, i.e., an amount of change in frequency of the received wave per unit time using the frequency of the received wave detected by the signal processing unit 7. The frequency determining unit 11 determines whether the ultrasonic wave received by the microphone 2 is a reflected wave of the probe wave transmitted from the microphone 2 based on the change rate detected by the change rate detecting unit 10. The frequency determining unit 11 transmits a signal corresponding to the determination result to the distance calculating unit 12.

The distance calculating unit 12 calculates a distance to an object outside the vehicle based on a time from transmission of the probe wave by the microphone 2 to reception of the reflected wave of the probe wave. Specifically, the distance calculating unit 12 calculates a distance to an object based on a time from transmission of the probe wave by the microphone 2 until the amplitude determining unit 9 determines that the amplitude of the received wave is equal to or more than a predetermined reference value.

Note that, in the present embodiment, the distance calculating unit 12 calculates a distance to an object only when the frequency determining unit 11 determines that the ultrasonic wave received by the microphone 2 is the reflected wave of the probe wave transmitted from the microphone 2.

The distance calculating unit 12 is connected to the notification unit 13 composed of a monitor, a buzzer, or the like, and when the calculated distance is equal to or less than a predetermined reference value, sends a signal indicating presence of an object at a short distance to the notification unit 13 to perform notification to a driver.

The controller 5, the distance calculating unit 12, and the like are configured by a known microcomputer including a CPU, a ROM, a RAM, an I/O unit, and the like and executes processing such as various calculations according to a program stored in the ROM or the like. The ROM and RAM are non-transitory tangible storage media.

In the object detection device 1, when the wave transmission instruction is sent from the controller 5 to the signal generating unit 4, the pulse signal generated by the signal generating unit 4 is D/A converted by the DA conversion unit 3, and the AC voltage is applied from the DA conversion unit 3 to the microphone 2, an ultrasonic wave being a probe wave is transmitted from the microphone 2.

Then, when the probe wave is reflected by an object outside the vehicle, and the microphone 2 receives the reflected wave of the probe wave, a voltage between two electrodes of the piezoelectric element included in the microphone 2 changes. The voltage is input to the AD conversion unit 6, and the AD conversion unit 6 A/D converts the input voltage according to the wave reception instruction from the controller 5 and outputs the thus generated signal to the signal processing unit 7.

The signal processing unit 7 analyzes the output signal of the AD conversion unit 6 by FFT to detect a frequency component included in the received wave. The amplitude detecting unit 8 detects an amplitude of the received wave from the frequency component detected by the signal processing unit 7, and the amplitude determining unit 9 determines whether the amplitude detected by the amplitude detecting unit 8 is equal to or more than a predetermined reference value.

When the amplitude of the received wave is determined to be equal to or more than the predetermined reference value by the amplitude determining unit 9, the distance calculating unit 12 calculates the distance to the object outside the vehicle based on a time elapsed from transmission of the probe wave by the microphone 2. Then, when the calculated distance is equal to or less than a predetermined reference value, the distance calculating unit 12 transmits a signal indicating presence of the object at a short distance to the notification unit 13, and notification to the driver is performed by the notification unit 13.

The object detection device 1 thus detects the object at a short distance and performs notification to the driver. However, the ultrasonic wave received by the microphone 2 may include, in addition to the reflected wave of the probe wave transmitted by the microphone 2, ultrasonic waves transmitted from devices other than the object detection device 1, for example, object detection devices of other vehicles. Therefore, in order to improve accuracy of an object detecting function, it is necessary to check whether the ultrasonic wave received by the microphone 2 is the reflected wave of the probe wave transmitted by the microphone 2.

Figure 2:
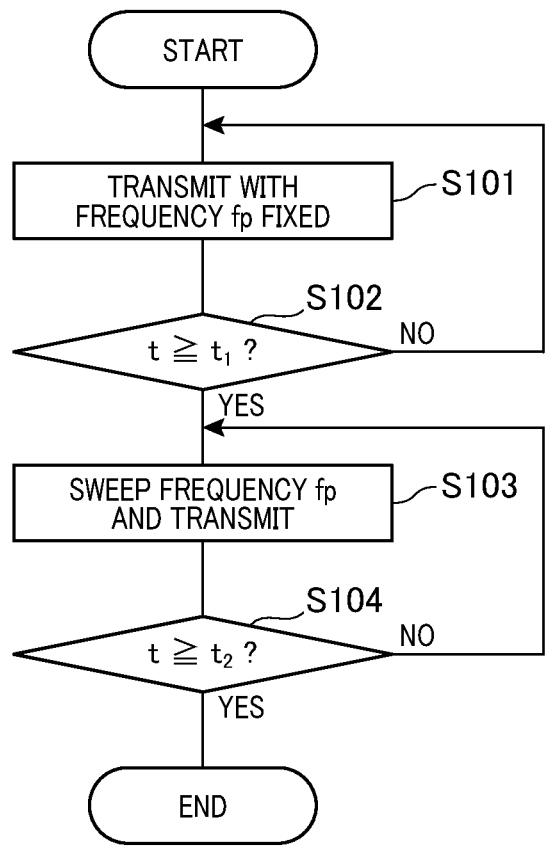
FIG. 2 is a flowchart of an operation of transmitting an ultrasonic wave.

Hence, in the present embodiment, a chirp signal that changes in frequency with lapse of time is included in a probe wave transmitted by the microphone 2. Specifically, the object detection device 1, when transmitting the probe wave from the microphone 2, performs processing of steps S101 to S104 shown in FIG. 2.

In the following discussion, a frequency of a pulse signal generated by the signal generating unit 4 is defined as $f_p$, an amplitude of a probe wave transmitted by the microphone 2 is defined as $A_t$, and a frequency and an amplitude of an ultrasonic wave received by the microphone 2 are defined as $f_r$ and $A_r$, respectively. In addition, a change rate of the frequency $f_p$ is define as $\Delta f_p$ and a change rate of the frequency $f_r$ is defined as $\Delta f_r$.

In step S101, the controller 5 sends a wave transmission instruction to the signal generating unit 4 and makes the signal generating unit 4 generate a pulse signal with the frequency $f_p$ fixed. Specifically, in step S101, the frequency $f_p$ is given by $f_{p1}$ shown in FIG. 4 which will be described later.

The pulse signal generated by the signal generating unit 4 is D/A converted by the DA conversion unit 3, and the thus generated AC voltage is applied to the microphone 2. Then, the microphone 2 transmits an ultrasonic wave of the frequency $f_p$.

In step S102, the controller 5 determines whether the microphone 2 has transmitted an ultrasonic wave for a predetermined cycle based on a time elapsed from sending of the wave transmission instruction to the signal generating unit 4. Specifically, a time elapsed after the controller 5 sends the wave transmission instruction to the signal generating unit 4, and the signal generating unit 4 starts generation of the pulse signal is defined as t. When a condition of $t \geq t_1$ is met, the controller 5 determines that the microphone 2 has transmitted the ultrasonic wave for the predetermined cycle. When the condition of $t \geq t_1$ is not satisfied, that is, a condition of $t < t_1$ is met, the controller 5 determines that the microphone 2 has not transmitted the ultrasonic wave for the predetermined cycle.

In the present embodiment, the value of $t_1$ is determined so that the number of pulses of the pulse signal generated by the signal generating unit 4 until $t \geq t_1$ is satisfied is equal to or more than one and equal to or less than ten.

The controller 5 proceeds to step S103 when determining in step S102 that the microphone 2 has transmitted the ultrasonic wave for a predetermined cycle, and proceeds to step S101 when determining that the microphone 2 has not transmitted the ultrasonic wave for a predetermined cycle.

In step S103, the controller 5 sends the wave transmission instruction to the signal generating unit 4 and sweeps the frequency $f_p$ of the pulse signal to be generated. In the present embodiment, the controller 5 increases the frequency $f_p$ with the lapse of time. Thereby, the microphone 2 transmits an ultrasonic wave that increases in frequency with the lapse of time. Furthermore, in the present embodiment, the frequency $f_p$ is swept from $f_{p1}$ to $f_{p2}$ shown in FIG. 4 to be described below.

In step S104, the controller 5 determines whether the microphone 2 has transmitted an ultrasonic wave for a predetermined cycle based on a time elapsed from sending of the wave transmission instruction of step S103 to the signal generating unit 4. Specifically, when $t \geq t_2$ is satisfied, the controller 5 determines that the microphone 2 has transmitted the ultrasonic wave for a predetermined cycle. When $t \geq t_2$ is not satisfied, that is, at $t < t_2$, the controller 5 determines that the microphone 2 has not transmitted the ultrasonic wave for a predetermined cycle.

The controller 5 terminates processing of transmitting the ultrasonic wave when determining in step S104 that the microphone 2 has transmitted the ultrasonic wave for a predetermined cycle, and proceeds to step S103 when determining that the microphone 2 has not transmitted the ultrasonic wave for a predetermined cycle.

Figure 3:
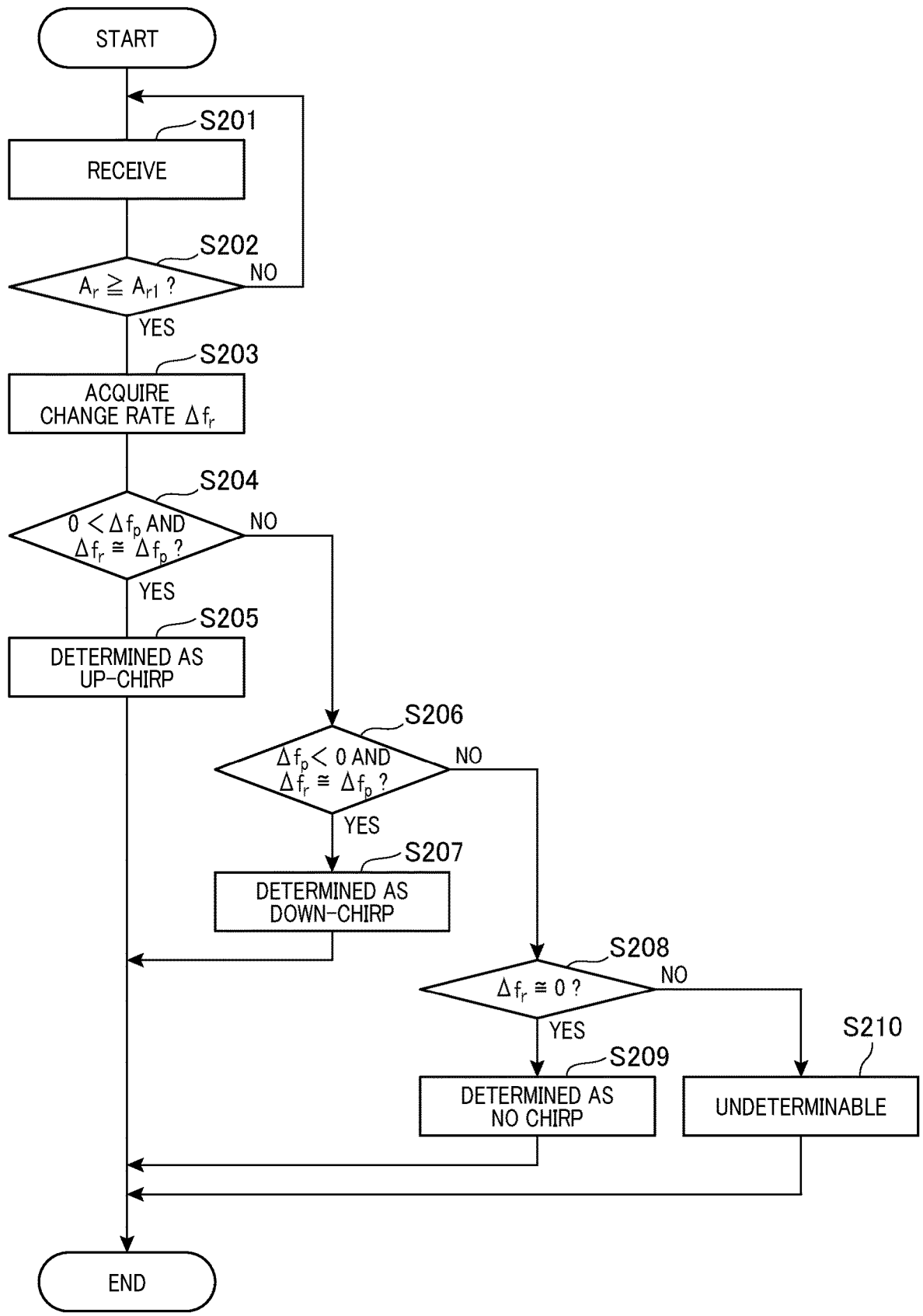
FIG. 3 is a flowchart of an operation of receiving an ultrasonic wave and determining presence or absence of a chirp signal.

As described above, the signal generating unit 4 generates a pulse signal with the frequency $f_p$ fixed until a predetermined time elapses from start of generation of the pulse signal and sweeps the frequency $f_p$ after the predetermined time has elapsed. With this, the frequency of the ultrasonic wave transmitted by the microphone 2 is made fixed until a predetermined time elapses from start of transmission and the frequency is swept after the predetermined time has elapsed. Then, the object detection device 1 determines whether the received ultrasonic wave is a reflected wave of the probe wave transmitted from the microphone 2 by performing processing of steps S201 to S210 shown in FIG. 3.

In step S201, the controller 5 sends a wave reception instruction to the AD conversion unit 6 and makes the AD conversion unit 6 A/D convert a voltage output from the microphone 2. The signal processing unit 7 analyzes the signal generated by the A/D conversion by FFT to detect a frequency component included in the received wave. Then, the amplitude detecting unit 8 detects an amplitude $A_r$ of the received wave from the frequency component detected by the signal processing unit 7.

In step S202, the amplitude determining unit 9 determines whether the amplitude $A_r$ determined by the amplitude detecting unit 8 is equal to or more than a predetermined reference value $A_{r1}$. The reference value $A_{r1}$ is selected to be a lower limit of the amplitude $A_r$ which enables the change of frequency $f_r$ to be appropriately observed.

If the amplitude determining unit 9 determines that the amplitude $A_r$ of the received wave is higher than or equal to the reference value $A_{r1}$, then the object detection device 1 proceeds to step S203. Alternatively, if the amplitude $A_r$ of the received wave is determined not to be higher than or equal to the reference value $A_{r1}$, the routine proceeds to step S201.

In step S203, the controller 5 sends the wave reception instruction to the AD conversion unit 6 and makes the AD conversion unit 6 acquire a voltage output from the microphone 2 for a predetermined time. The signal processing unit 7 analyzes the signal generated by the A/D conversion by FFT to detect a frequency included in the received wave. Then, the change rate detecting unit 10 determines a change rate $\Delta f_r$ of a frequency of the received wave by using the frequency detected by the signal processing unit 7.

Note that the object detection device 1 performs detection of the change rate of the frequency component having a large amplitude to some extent among the frequency components detected by the signal processing unit 7 in step S203 and performs processing of step S204 and thereafter. When there are a plurality of frequency components having large amplitudes, the object detection device 1 performs detection of the change rate and processing of step S204 and thereafter for each of such a plurality of frequency components.

In step S204, the frequency determining unit 11 determines whether $0<\Delta f_p$ and $\Delta f_r \cong \Delta f_p$ are satisfied. Specifically, whether $0<\Delta f_p$ and $\Delta f_p - \alpha \leq \Delta f_r \leq \Delta f_p + \alpha$ are satisfied is determined by using a predetermined value $\alpha$.

When it is determined by the frequency determining unit 11 that $0<\Delta f_p$ and $\Delta f_r \cong \Delta f_p$ are satisfied, the object detection device 1 proceeds to step S205, determines that the received wave includes an up-chirp signal that increases in frequency with lapse of time, and terminates the determination processing of the received wave. In the present embodiment, it is determined by step S205 that the ultrasonic wave received by the microphone 2 includes a reflected wave of the probe wave transmitted by the microphone 2. As described above, when the frequency $f_r$ of the received wave makes the same change as the frequency $f_p$, the frequency determining unit 11 determines that the received wave includes the reflected wave of the probe wave transmitted by the microphone 2.

On the other hand, when it is determined by the frequency determining unit 11 that $0<\Delta f_p$ is not satisfied or $\Delta f_r \cong \Delta f_p$ is not satisfied, the object detection device 1 proceeds to step S206. In step S206, the frequency determining unit 11 determines whether $\Delta f_p<0$ and $\Delta f_r \cong \Delta f_p$ are satisfied. Specifically, it is determined whether $\Delta f_p<0$ and $\Delta f_p - \beta \leq \Delta f_r \leq \Delta f_p + \beta$ are satisfied by using a predetermined value $\beta$.

When it is determined by the frequency determining unit 11 that $\Delta f_p<0$ and $\Delta f_r \cong \Delta f_p$ are satisfied, the object detection device 1 proceeds to step S207, determines that the received wave includes a down-chirp signal that decreases in frequency, and terminates the determination processing of the received wave. On the other hand, when it is determined by the frequency determining unit 11 that $\Delta f_p<0$ is not satisfied or $\Delta f_r \cong \Delta f_p$ is not satisfied, the object detection device 1 proceeds to step S208.

In step S208, the frequency determining unit 11 determines whether $\Delta f_r \cong 0$ is satisfied, specifically whether $-|\Delta f_p| + \beta < \Delta f_r < |\Delta f_p| - \alpha$ is satisfied. When it is determined by the frequency determining unit 11 that $\Delta f_r \cong 0$ is satisfied, the object detection device 1 proceeds to step S209, determines that the received wave does not include a chirp signal, and terminates the determination processing of the received wave. On the other hand, when it is determined by the frequency determining unit 11 that $\Delta f_r \cong 0$ is not satisfied, the object detection device 1 proceeds to step S210, determines that it is impossible to determine whether the received wave includes a chirp signal, and terminates the determination processing of the received wave.

As described above, in the present embodiment, the frequency $f_p$ is swept after a predetermined time has elapsed from start of transmission of the probe wave. Then, when the change rate $\Delta f_r$ after the amplitude $A_r$ of the received wave becomes higher than or equal to the reference value $A_{r1}$ is almost equal to the change rate 44, it is determined that the received wave includes the reflected wave of the probe wave transmitted by the microphone 2. When it is determined by the frequency determining unit 11 that the received wave includes the reflected wave of the probe wave transmitted from the microphone 2, the distance calculating unit 12 calculates the distance to the object outside the vehicle based on a time from transmission of the probe wave by the microphone 2 to reception of the ultrasonic wave.

Effects of the present embodiment will be described. A relation between the frequency $f_p$ of the pulse signal generated by the signal generating unit 4 and the amplitude $A_t$ of the ultrasonic wave transmitted from the microphone 2 when the AC voltage of frequency $f_p$ is continuously applied to the microphone 2 is, for example, as indicated by a solid line in FIG. 4.

That is, the amplitude $A_t$ takes the maximum value at $f_p = f_{p0}$. The amplitude $A_t$ decreases as the frequency $f_p$ diverges from $f_{p0}$. The amplitude $A_t$ becomes equal to or more than a predetermined value in a predetermined frequency range including $f_{p0}$.

For example, if the lower limit of the amplitude $A_r$ of the received wave at which the change of the frequency $f_r$ can be appropriately observed is defined as $A_{r1}$, and the amplitude $A_t$ of the probe wave when $A_r = A_{r1}$ is defined as $A_{t1}$, of the frequencies $f_p$s which give $A_t = A_{t1}$, the one smaller than $f_{p0}$ is defined as $f_{p1}$, and the one larger than $f_{p0}$ is defined as $f_{p2}$, a condition of $A_{r1} \leq A_r$ is satisfied by setting the frequency $f_p$ to be equal to or more than $f_{p1}$ and equal to or less than $f_{p2}$, which enables the change of the frequency $f_r$ to be appropriately observed.

Figure 4:
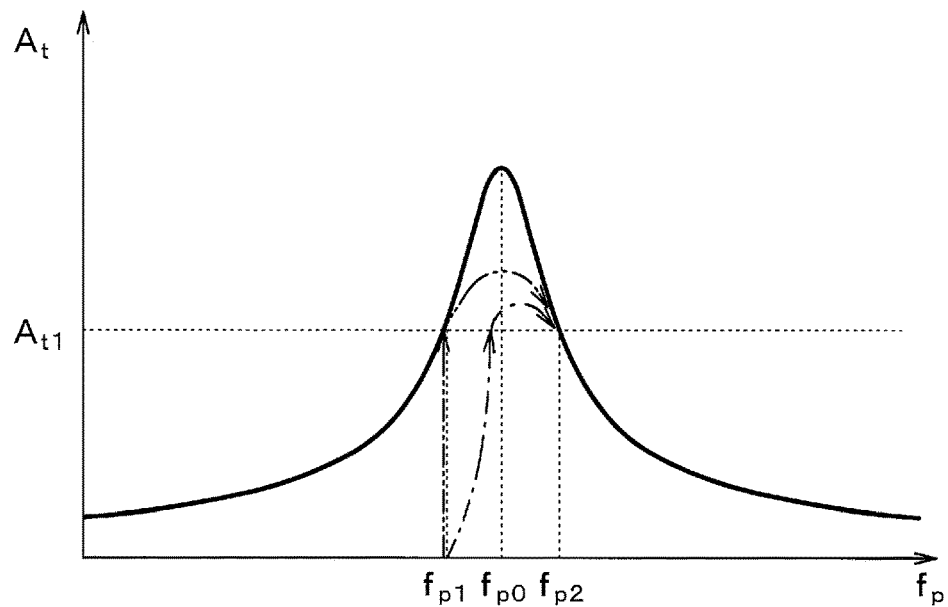
FIG. 4 is a resonant curve of a microphone.

However, the amplitude $A_t$ of the probe wave reaches a magnitude indicated by the solid line in FIG. 4 after the AC voltage is continuously applied to the microphone 2 for a predetermined time. That is, $A_{r1} \leq A_r$ is satisfied when the pulse signal having the frequency $f_p$ that is made to be equal to or more than $f_{p1}$ and equal to or less than $f_{p2}$ is continuously input to the transmission unit including the microphone 2 and the DA conversion unit 3.

Figure 5:
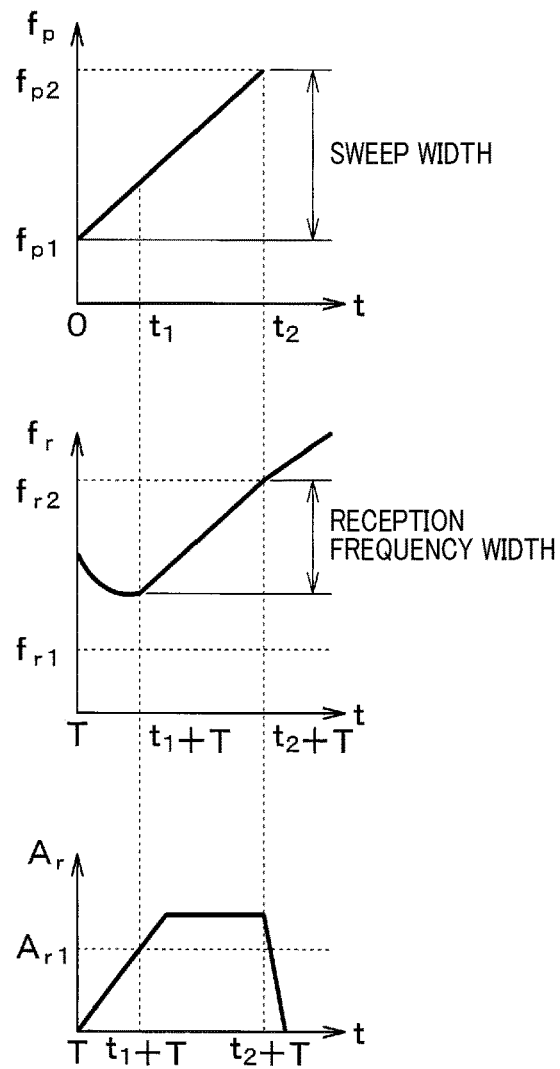
FIG. 5 is a graph showing time changes of a frequency of a pulse signal, a frequency of a received wave, and an amplitude of the received wave in a conventional object detection device.

Thus, as shown in FIG. 5, when sweeping of the frequency $f_p$ is started simultaneously with start of application of the AC voltage to the microphone 2, as indicated by the chain line in FIG. 4, the amplitude $A_t$ reaches $A_{t1}$ after the frequency $f_p$ is swept to some extent. Thereby, as shown in FIG. 5, the amplitude $A_r$ reaches $A_{r1}$ after a certain time has elapsed after the reflected wave of the probe wave reached the microphone 2.

Therefore, as shown in FIG. 5, the change bandwidth of the frequency $f_r$ after the amplitude $A_r$ reaches $A_{r1}$ and the change of the frequency $f_r$ can be appropriately observed is narrower than the sweep bandwidth of the frequency $f_p$. Accordingly, detection of the chirp signal and discrimination of the ultrasonic wave become difficult.

Figure 6:
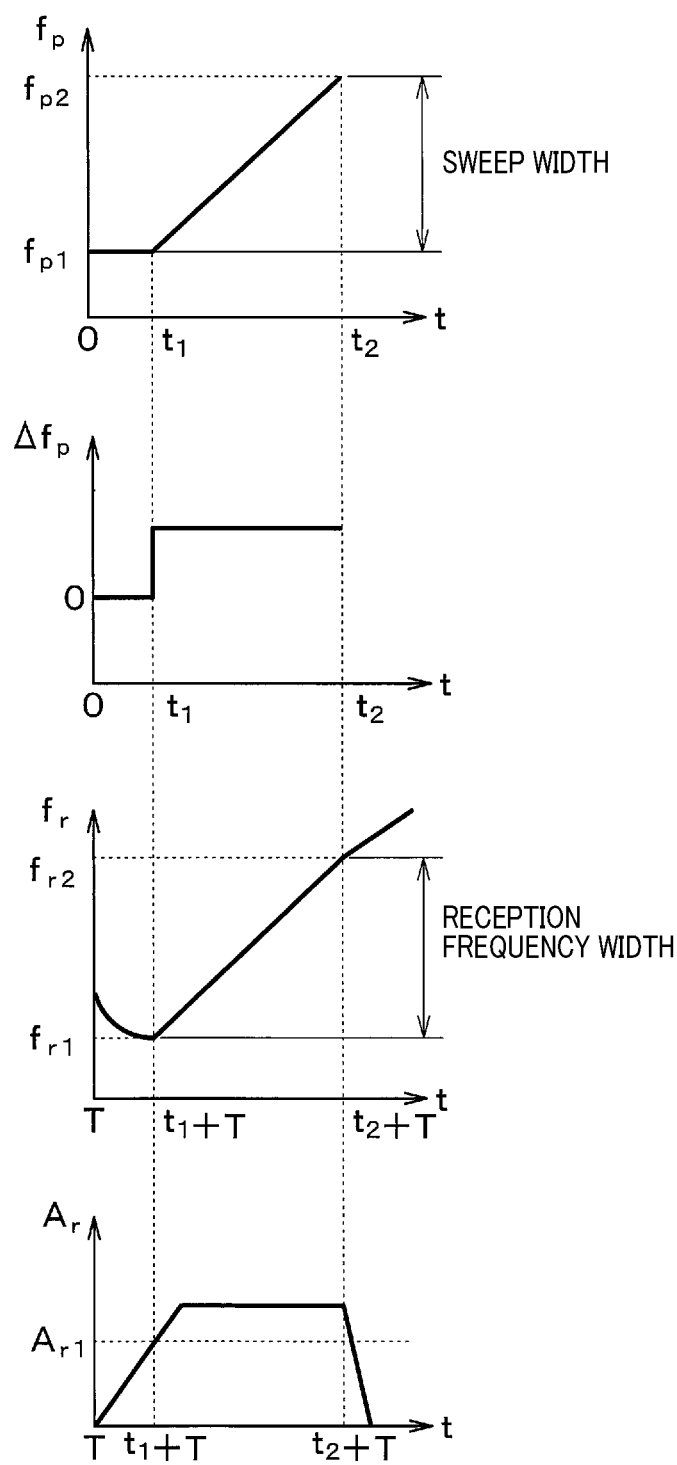
FIG. 6 is a graph showing time changes of a frequency of a pulse signal, a change rate of a frequency of the pulse signal, a frequency of a received wave, and an amplitude of the received wave in a first embodiment.

Note that, in the graphs of FIG. 5 and FIG. 6 to be described below, T is a time from transmission of the probe wave to reception of the reflected wave of the probe wave by the microphone 2. In addition, $f_{r1}$ and $f_{r2}$ are frequencies of the received wave when $f_p = f_{p1}$ and $f_p = f_{p2}$, respectively. In the graph of frequency $f_r$ of FIG. 5, the frequency $f_r$ changes differently from the frequency $f_p$ when $t < t_1 + T$ and $t_2 + T < t$, and this is because when the amplitude $A_r$ is small, the frequency $f_r$ to be detected is not stable.

On the other hand, in the present embodiment, the frequency $f_p$ is swept from $f_{p1}$ to $f_{p2}$ after a predetermined time has elapsed from start of application of the AC voltage to the microphone 2. At this time, the signal generating unit 4 generates a pulse signal so that $A_r \geq A_{r1}$ at $t=t_1$, and thereby, as shown in FIG. 6, the change bandwidth of the frequency $f_r$ after the amplitude $A_r$ reaches $A_{r1}$ becomes almost equal to the sweep bandwidth of the frequency $f_p$ and a characteristic amount of the chirp signal becomes large.

Figure 7:
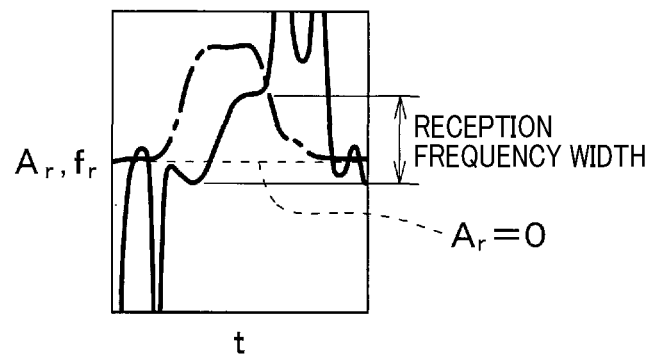
FIG. 7 is a graph showing time changes of an amplitude and a frequency of a received wave in the conventional object detection device.
Figure 8:
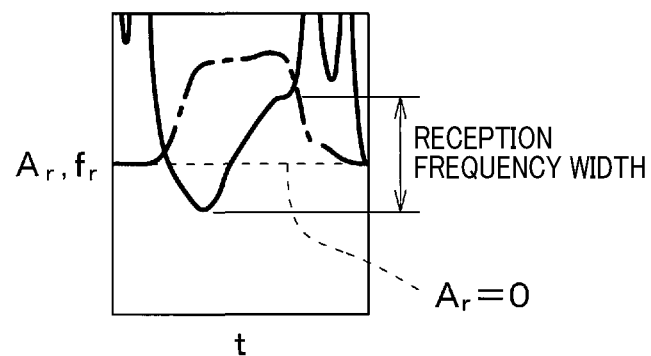
FIG. 8 is a graph showing changes of an amplitude and a frequency of a received wave with time in the first embodiment.

FIG. 7 and FIG. 8 are graphs of experimental results when the frequency $f_p$ is swept by the method shown in FIG. 5 and the method of the present embodiment, respectively. From these graphs, too, it is known that in the present embodiment, the change bandwidth of the frequency $f_r$ is wider than that by the method shown in FIG. 5. Note that, in FIG. 7, FIG. 8, and FIGS. 25, 26 to be described below, the solid line indicates the frequency $f_r$ and the chain line indicates the amplitude $A_r$.

As described above, in the present embodiment, since the characteristic amount of the chirp signal to be observed becomes large, detection of the chirp signal and discrimination of the ultrasonic wave become easy.

Note that, in order to make the amplitude $A_r$ sufficiently large until $t=t_1$, it is preferable that the frequency $f_p$ before start of sweeping has a value close to $f_{p0}$. Specifically, for example, it is preferable that the frequency $f_p$ before start of sweeping is selected to be higher than or equal to $f_{p1}$ and lower than or equal to $f_{p2}$.

In addition, when the frequency $f_p$ is swept immediately after start of application of the AC voltage, if the frequency $f_p$ is changed steeply, the change bandwidth of the frequency $f_r$ becomes narrower. On the other hand, in the present embodiment, sweeping of the frequency $f_p$ is started when $t \geq t_1$ and the frequency $f_r$ is swept after the amplitude $A_r$ reaches $A_{r1}$, and therefore it is possible to suppress reduction in the change bandwidth of the frequency $f_r$ when the frequency $f_p$ is changed steeply. Thus, it is possible to shorten the length of the chirp signal and shorten the time required to detect the object.

Furthermore, in the present embodiment, the frequency $f_p$ until the sweeping is started is made fixed. This makes it easy to distinguish a signal before start of sweeping from a signal after start of sweeping and makes it easier to detect the chirp signal.

Second Embodiment

The second embodiment will be described. The second embodiment is modified in the configuration of the pulse signal from the first embodiment and other portions are similar to those in the first embodiment, and therefore only portions different from the first embodiment will be described.

In the present embodiment, two chirp signals are combined to generate a pulse signal.

Figure 9:
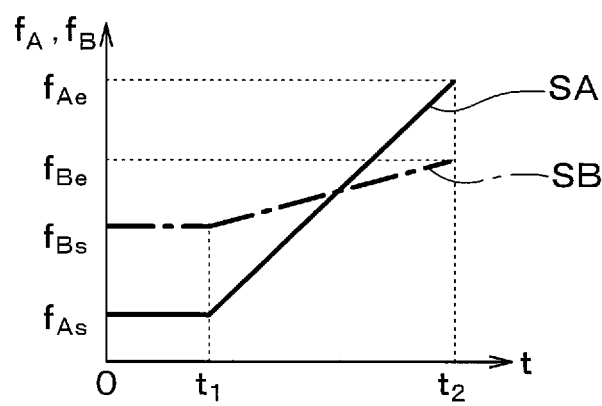
FIG. 9 is a graph showing time changes of frequencies of pulse signals in a second embodiment.

Specifically, the signal generating unit 4 generates a pulse signal in which a signal SA indicated by the solid line in FIG. 9 and a signal SB indicated by the chain line are combined. The signal SA and the signal SB correspond to a first pulse signal and a second pulse signal, respectively. The frequencies of the signal SA and the signal SB are $f_A$ and $f_B$, respectively, and the change rates of the frequencies $f_A$ and $f_B$ are $\Delta f_A$ and $\Delta f_B$, respectively.

The signal generating unit 4, after generating the signal SA with the frequency $f_A$ fixed, starts sweeping of the frequency $f_A$. In addition, the signal generating unit 4, after generating the signal SB with the frequency $f_B$ fixed, starts sweeping of the frequency $f_B$.

If the frequency from when generation of the signal SA is started until when the sweeping is started is defined as $f_{As}$ and the frequency when the sweeping is ended is defined as $f_{Ae}$, they are selected to meet conditions of $f_{As}=f_{p1}$ and $f_{Ae}=f_{p2}$ in this embodiment. In addition, if the frequency from when generation of the signal SB is started until when the sweeping is started is defined as $f_{Bs}$ and the frequency when the sweeping is ended is defined as $f_{Be}$, they are selected to meet a condition of $f_{As}<f_{Bs}<f_{Be}<f_{Ae}$ in this embodiment. When the signal processing unit 7 detects a plurality of frequencies, and further the plurality of frequencies include frequencies that make the same change as the frequency $f_A$ and frequencies that make the same change as the frequency $f_B$, the frequency determining unit 11 determines that the received wave includes the reflected wave of the probe wave.

Specifically, when the received wave includes the reflected wave of the probe wave transmitted by the microphone 2, in step S203, frequency components respectively corresponding to the signal SA and the signal SB are detected. Then, when step S204 is performed on the frequency corresponding to the signal SA, $\Delta f_r \cong \Delta f_A$ is satisfied, and the object detection device 1 proceeds to step S205 and determines that the received wave includes the signal SA. In addition, when step S204 is performed on the frequency corresponding to the signal SB, $\Delta f_r \cong \Delta f_B$ is satisfied, and the object detection device 1 proceeds to step S205 and determines that the received wave includes the signal SB. Thus, step S205 is performed on two frequencies, and thereby the object detection device 1 determines that the received wave includes the reflected wave of the probe wave transmitted by the microphone 2.

In the present embodiment in which two chirp signals are used in combination, detection accuracy of the chirp signal is improved, and discrimination accuracy of the ultrasonic wave is improved.

Third Embodiment

The third embodiment will be described. The third embodiment is the embodiment in which one chirp signal is changed to a down-chirp signal from the second embodiment and other portions are similar to those in the second embodiment, and therefore only portions different from the second embodiment will be described.

Figure 10:
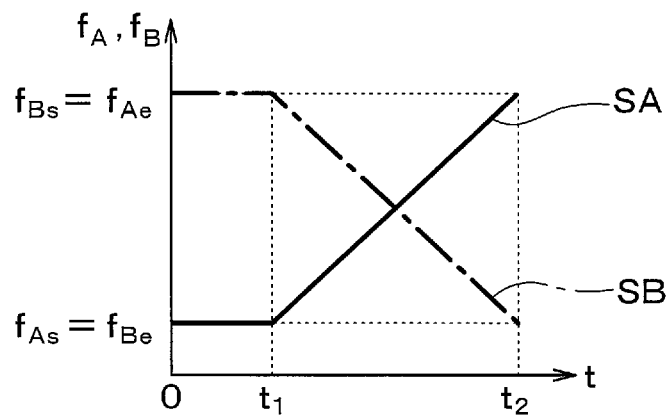
FIG. 10 is a graph showing time changes of frequencies of pulse signals in a third embodiment.

In the present embodiment, the change rate $\Delta f_B$ is, as shown in FIG. 10, selected to be a negative value. In step S103, the frequency $f_B$ of the signal SB is reduced to fall in a range of $f_{Be}<f_{Bs}$. In addition, conditions of $f_{As}=f_{Be}$ and $f_{Bs}=f_{Ae}$ are met.

In the present embodiment, in step S204, whether $\Delta f_r \cong \Delta f_A$ is satisfied is determined, and when it is determined that $\Delta f_r \cong \Delta f_A$ is satisfied, the object detection device 1 proceeds to step 205. Further, in step S206, whether $\Delta f_r \cong \Delta f_B$ is satisfied is determined, and when it is determined that $\Delta f_r \cong \Delta f_B$ is satisfied, the object detection device 1 proceeds to step S207.

If the received wave includes the reflected wave of the probe wave transmitted by the microphone 2, in step S204, it is determined that $\Delta f_r \cong \Delta f_A$ is satisfied for the frequency corresponding to the signal SA. Then, the object detection device 1 proceeds to step S205 and determines that the received wave includes the signal SA. In addition, in step S204, it is determined that $\Delta f_r \cong \Delta f_A$ is not satisfied for the frequency corresponding to the signal SB, and the object detection device 1 proceeds to step S206. Then, in step S206, it is determined that $\Delta f_r \cong \Delta f_B$ is satisfied, and the object detection device 1 proceeds to step S207 and determines that the received wave includes the signal SB. Thus, step S205 is performed on one frequency and step S207 is performed on another frequency, and thereby the object detection device 1 determines that the received wave includes the reflected wave of the probe wave transmitted by the microphone 2, In the present embodiment in which an up-chirp signal and a down-chirp signal are used in combination, too, the detection accuracy of the chirp signal is improved as in the second embodiment.

Furthermore, in the present embodiment, since an up-chirp signal and a down-chirp signal are used in combination, each chirp signal can increase the frequency change bandwidth. That is, each of frequency sweep bandwidths of the signal SA and the signal SB can be set to $f_{p2}-f_{p1}$. This further improves the detection accuracy of the chirp signal.

Figure 11:
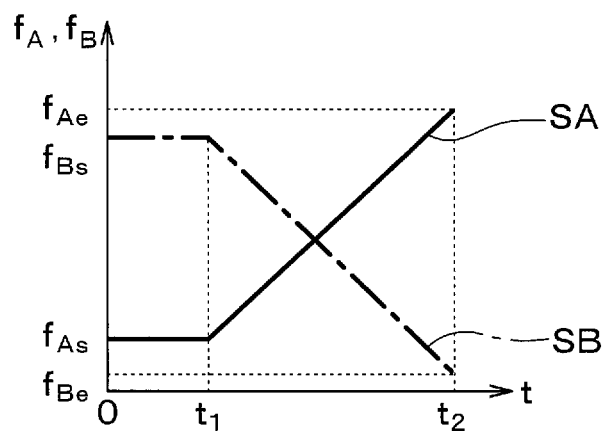
FIG. 11 is a graph showing time changes of frequencies of pulse signals in a first variation of the third embodiment.

Note that, in the present embodiment, $f_{As}$, $f_{Be}$, $f_{Bs}$, and $f_{Ae}$ are selected to meet the conditions of $f_{As}=f_{Be}$ and $f_{Bs}=f_{Ae}$, but they may alternatively selected to meet $f_{As}\neq f_{Be}$ and $f_{Bs}\neq f_{Ae}$. For example, as shown in FIG. 11, conditions of $f_{As}>f_{Be}$ and $f_{Bs}<f_{Ae}$ may be satisfied. Furthermore, a condition of $f_{As}<f_{Be}$ or $f_{Bs}>f_{Ae}$ may be met.

Figure 12:
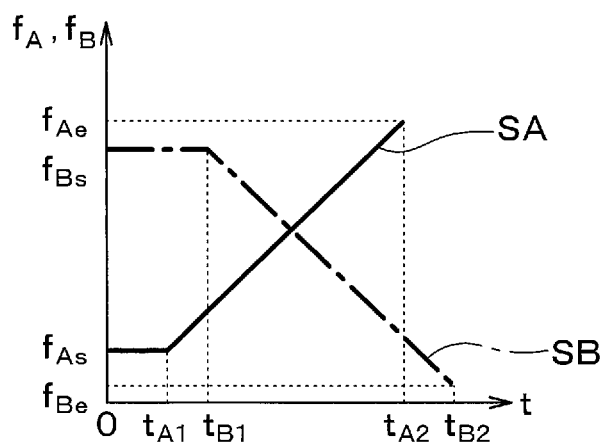
FIG. 12 is a graph showing time changes of frequencies of pulse signals in a second variation of the third embodiment.

In addition, a time until start of sweeping may be different between the signal SA and the signal SB. For example, as shown in FIG. 12, the sweeping may be started earlier in the signal SA than in the signal SB. Specifically, when the sweeping of the signal SA is started at $t=t_{A1}$ and that of the signal SB is started at $t=t_{B1}$, and the sweeping of the signal SA is ended at $t=t_{A2}$ and that of the signal SB is ended at $t=t_{B2}$, $t_{A1}<t_{B1}$ may be satisfied. In addition, $t_{A2}<t_{B2}$ may also be satisfied.

Figure 13:
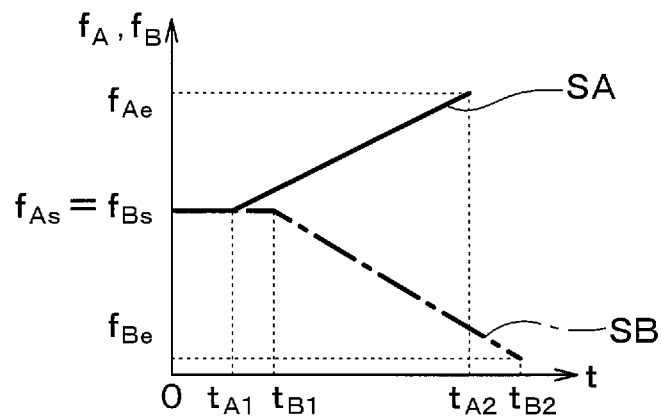
FIG. 13 is a graph showing time changes of frequencies of pulse signals in a third variation of the third embodiment.

Furthermore, as shown in FIG. 13, $f_{As}=f_{Bs}$ may be satisfied. In this case, similarly to a variation shown in FIG. 12, a time until start of sweeping may be different between the signal SA and the signal SB. Further, a time interval between start and end of sweeping may be different between the signal SA and the signal SB.

Fourth Embodiment

The fourth embodiment will be described. The fourth embodiment is the embodiment in which the frequency $f_p$ before start of sweeping is changed from the first embodiment and other portions are similar to those in the first embodiment, and therefore only portions different from the first embodiment will be described.

Figure 14:
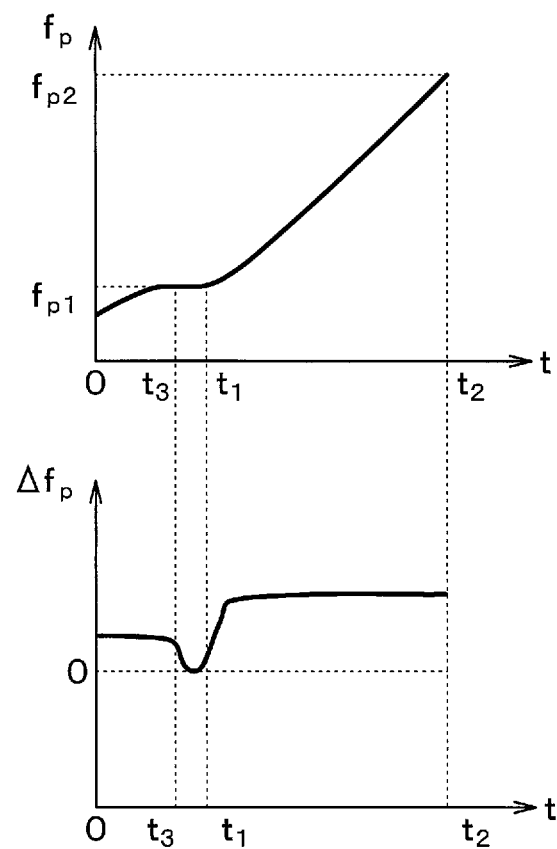
FIG. 14 is a graph showing time changes of frequencies of pulse signals in a fourth embodiment.

In the first embodiment, the frequency $f_p$ before start of sweeping is fixed, but the frequency $f_p$ may be changed before start of sweeping. For example, as shown in FIG. 14, the frequency $f_p$ may be increased with lapse of time in the period of time $0\leq t<t_3$, and the frequency $f_p$ may be kept constant in the period of time $t_3\leq t<t_1$.

In the present embodiment in which the frequency $f_p$ is changed in the period of time $0\leq t<t_1$, too, similarly to the first embodiment, it becomes easy to detect the chirp signal. In addition, even if the frequency $f_p$ is changed in the period of time $0\leq t<t_3$, the frequency $f_p$ is kept constant in the period of time $t_3\leq t<t_1$, and thereby it becomes easier to detect the chirp signal similarly to the first embodiment.

Note that, in the present embodiment, the frequency $f_p$ at $t=0$ is selected to be lower than $f_{p1}$, and the frequency $f_p$ is increased to become $f_p=f_{p1}$ at $t=t_3$. However, the frequency $f_p$ at $t=0$ may be set to be higher than $f_{p1}$, and the frequency $f_p$ may be reduced to become $f_p=f_{p1}$ at $t=t_3$.

Figure 15:
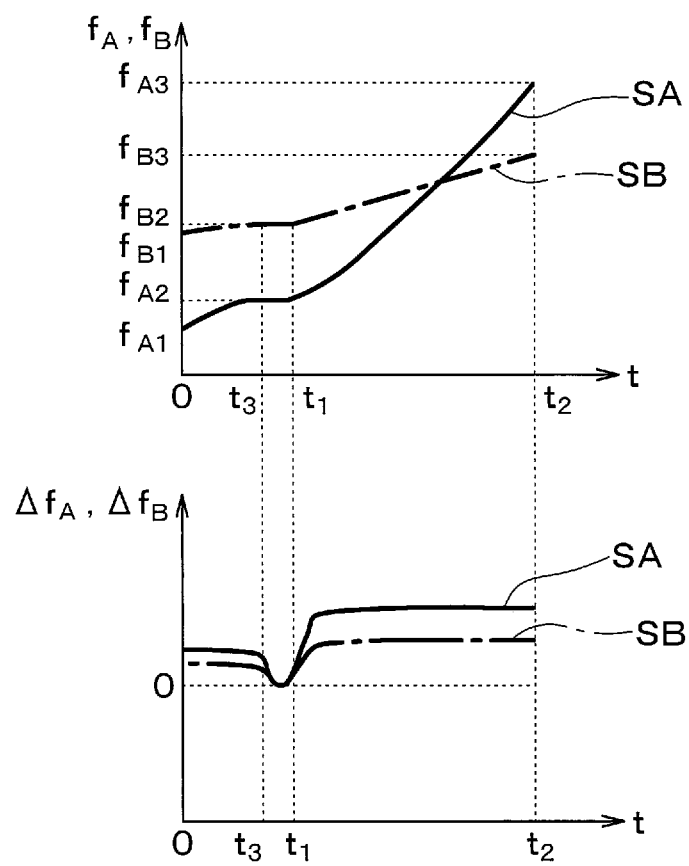
FIG. 15 is a graph showing time changes of frequencies of pulse signals in a first variation of the fourth embodiment.

In addition, in the present embodiment, the frequency $f_p$ before start of sweeping is changed from the first embodiment, but, as shown in FIG. 15, the frequencies before start of sweeping of the signal SA and the signal SB of the second embodiment may be changed similarly to the present embodiment.

In other words, if the frequencies $f_A$ of the signal SA at $t=0$, for $t_3\leq t\leq t_1$, and at $t=t_2$ are defined as $f_{A1}$, $f_{A2}$, and $f_{A3}$, respectively, and the frequencies $f_B$ of the signal SB at $t=0$, for $t_3\leq t\leq t_1$, and at $t=t_2$ are defined as $f_{B1}$, $f_{B2}$, and $f_{B3}$, respectively, they may be selected to meet conditions of $f_{A1}<f_{A2}<f_{A3}$ and $f_{B1}<f_{B2}<f_{B3}$. In a variation shown in FIG. 15, too, similarly to the second embodiment, the detection accuracy of the chirp signal is improved.

Figure 16:
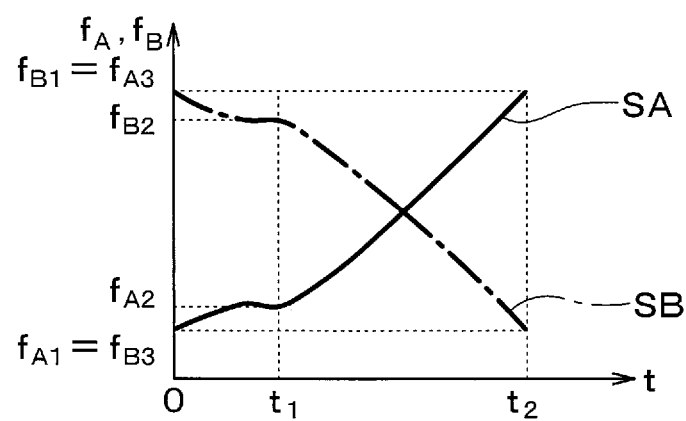
FIG. 16 is a graph showing time changes of frequencies of pulse signals in a second variation of the fourth embodiment.

In addition, the frequencies before start of sweeping of the signal SA and the signal SB of the third embodiment may be, as shown in FIG. 16, changed similarly to this embodiment. Specifically, they may be selected to meet a condition of $f_{B3}<f_{B2}<f_{B1}$. In this modification, the detection accuracy of the chirp signal is, like in the third embodiment, improved.

Figure 17:
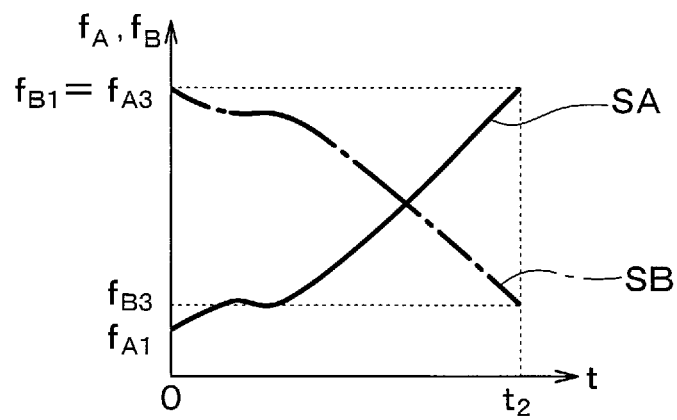
FIG. 17 is a graph showing time changes of frequencies of pulse signals in a third variation of the fourth embodiment.
Figure 18:
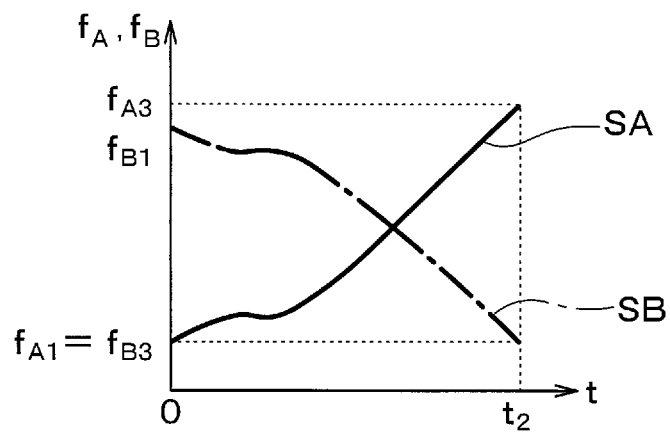
FIG. 18 is a graph showing time changes of frequencies of pulse signals in a fourth variation of the fourth embodiment.

In addition, in the modification shown in FIG. 16, $f_{A1}=f_{B3}$ and $f_{B1}=f_{A3}$, but it is possible that $f_{A1}\neq f_{B3}$ and $f_{B1}\neq f_{A3}$. For example, as shown in FIG. 17, a condition of $f_{A1}<f_{B3}$ may be satisfied. Furthermore, as shown in FIG. 18, a condition of $f_{B1}<f_{A3}$ may also be satisfied.

Figure 19:
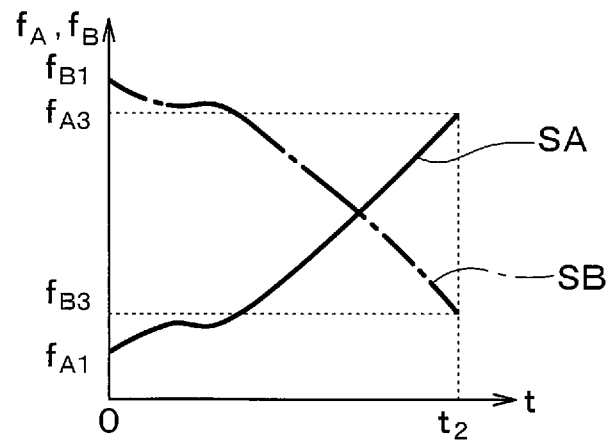
FIG. 19 is a graph showing time changes of frequencies of pulse signals in a fifth variation of the fourth embodiment.
Figure 20:
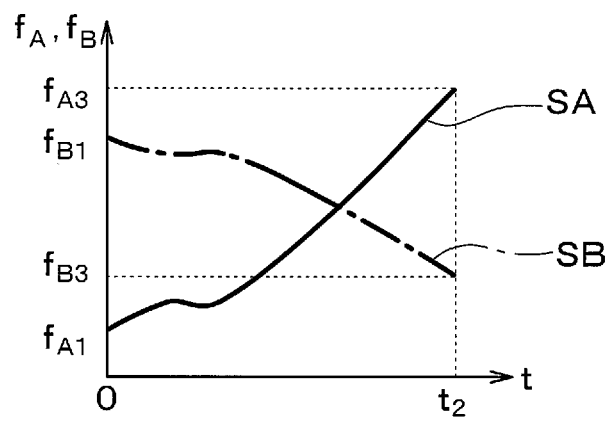
FIG. 20 is a graph showing time changes of frequencies of pulse signals in a sixth variation of the fourth embodiment.

In addition, as shown in FIG. 19, a condition of $f_{A1}<f_{B3}$ and $f_{A3}<f_{B1}$ may also be satisfied. Further, as shown in FIG. 20, conditions of $f_{A1}<f_{B3}$ and $f_{B1}<f_{A3}$ may alternatively be satisfied.

Figure 21:
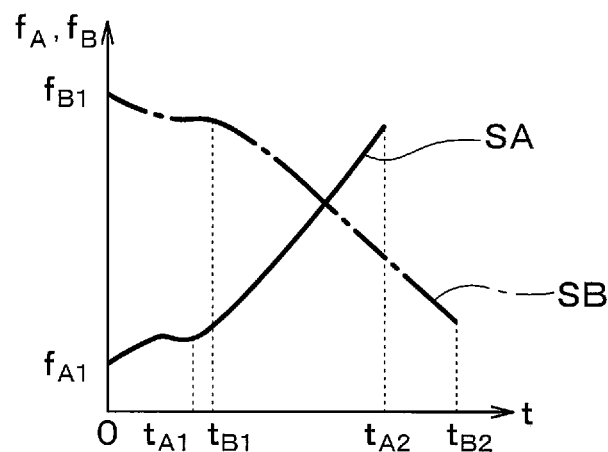
FIG. 21 is a graph showing time changes of frequencies of pulse signals in a seventh variation of the fourth embodiment.

In addition, although in the variation shown in FIG. 16, a time from start of signal generation to start of sweeping is the same between the signal SA and the signal SB, as shown in FIG. 21, the time from start of signal generation to start of sweeping may be different between the signal SA and the signal SB. Furthermore, although in the variation shown in FIG. 16, a time from start of sweeping to end of sweeping is the same between the signal SA and the signal SB, as shown in FIG. 21, the time from start of sweeping to end of sweeping may be different between the signal SA and the signal SB.

Fifth Embodiment

The fifth embodiment will be described. The fifth embodiment is the embodiment in which a timing of start of sweeping of the frequency $f_p$ is changed from the third embodiment and other portions are similar to those in the third embodiment, and therefore only portions different from the third embodiment will be described.

Figure 22:
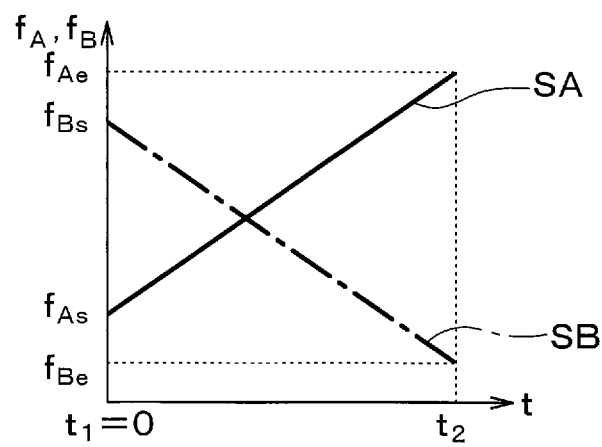
FIG. 22 is a graph showing time changes of frequencies of pulse signals in a fifth embodiment.

In the present embodiment, the frequencies of the signal SA and the signal SB are swept while the microphone 2 transmits the probe wave. Specifically, as shown in FIG. 22, a condition of $t_1=0$ is met. In other words, when $t=0$, i.e., at a time when pulse signal generation is started, both frequencies of the signal SA and the signal SB start to be swept. In the present embodiment, conditions of $f_{Be}<f_{As}$ and $f_{Bs}<f_{Ae}$ are satisfied.

Figure 23:
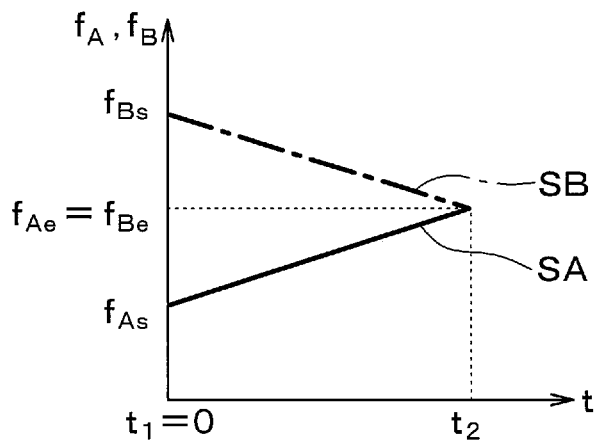
FIG. 23 is a graph showing time changes of frequencies of pulse signals in the conventional object detection device.

As apparent from the above discussion, the present embodiment in which the frequency of the pulse signal is swept from when $t=0$, the conditions of $f_{As}<f_{Ae}$, $f_{Bs}>f_{Be}$, and $f_{As}<f_{Bs}$ are satisfied, and further the condition of $f_{Be}<f_{Ae}$ is satisfied enables the sweep bandwidth of each of the signals SA and SB to be widened as compared with a case wherein a condition of $f_{Ae}=f_{Be}$ is, as shown in FIG. 23, satisfied. This facilitates the ease with which the chirp signal is detected, and the ultrasonic wave is discriminated.

Figure 24:
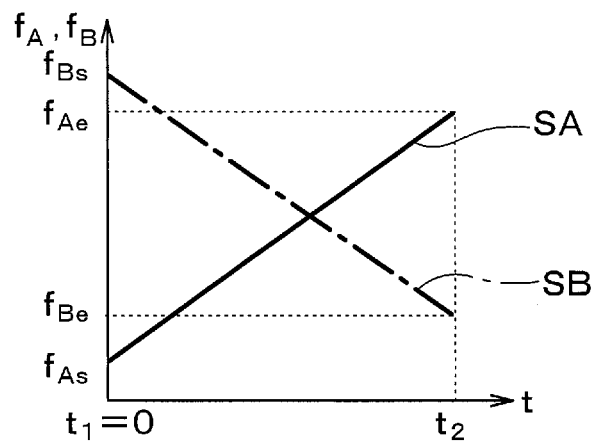
FIG. 24 is a graph showing time changes of frequencies of pulse signals in a variation of the fifth embodiment.

Note that, although in the present embodiment, the conditions of $f_{Be}<f_{As}$ and $f_{Bs}<f_{Ae}$ are satisfied, conditions of $f_{Be} > f_{As}$ and $f_{Bs} > f_{Ae}$ shown in FIG. 24 may alternatively be satisfied. Alternatively, conditions of $f_{As} = f_{Be}$ and $f_{Ae} = f_{Bs}$ may be satisfied.

MODIFICATIONS

It should be noted that the present disclosure is not limited to the above-described embodiments and can be appropriately modified. In addition, the above-described embodiments are not unrelated to each other and can be combined appropriately except the case where combinations are clearly impossible. In addition, needless to say, in each of the above-described embodiments, an element constituting the embodiment is not necessarily indispensable except in the case of clearly specifying that it is particularly indispensable or the case where it is considered to be clearly indispensable in principle.

Figure 25:
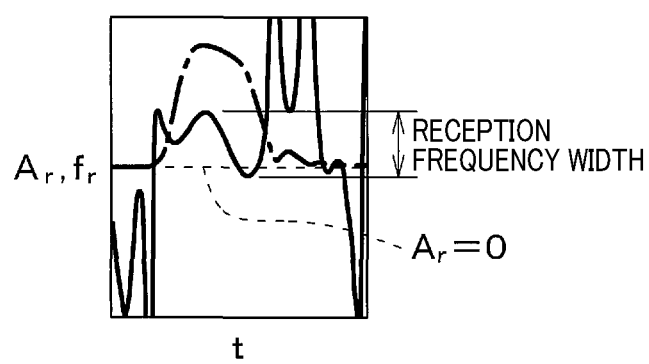
FIG. 25 is a graph showing time changes of an amplitude and a frequency of a received wave in the conventional object detection device.

For example, in the first embodiment, the frequency $f_p$ of the pulse signal is increased in step S103, but the frequency $f_p$ may alternatively be decreased. For example, conditions of $f_p = f_{p2}$ for $0 \leq t < t_1$ and $f_p = f_{p1}$ for $t = t_2$ may be satisfied. In this case, in step S207, it is determined that the received wave includes the reflected wave of the probe wave transmitted by the microphone 2. In the case where the frequency $f_p$ is decreased, too, as shown in FIG. 25 and FIG. 26, the changeable bandwidth of the frequency $f_r$ may be widened compared with the conventional method. In addition, the chirp signal that decreases in frequency may be used in combination as in the second embodiment.

In addition, in the first to fifth embodiments, the frequency $f_p$ is continuously changed before or after start of sweeping, but the frequency $f_p$ may be discontinuously changed before and/or after start of sweeping. For example, as shown in FIG. 27, the frequency $f_p$ before start of sweeping may be fixed at a constant value higher than $f_{p1}$, and the frequency $f_p$ at start of sweeping may be set to $f_{p1}$.

In addition, in the fourth embodiment, the frequency $f_p$ is kept constant for $t_3 \leq t < t_1$ in order to make it easier to detect the chirp signal, but the frequency $f_p$ may be changed until immediately before start of sweeping if the amplitude $A_r$ is permitted to be increased to be sufficiently high until start of sweeping.

Figure 28:
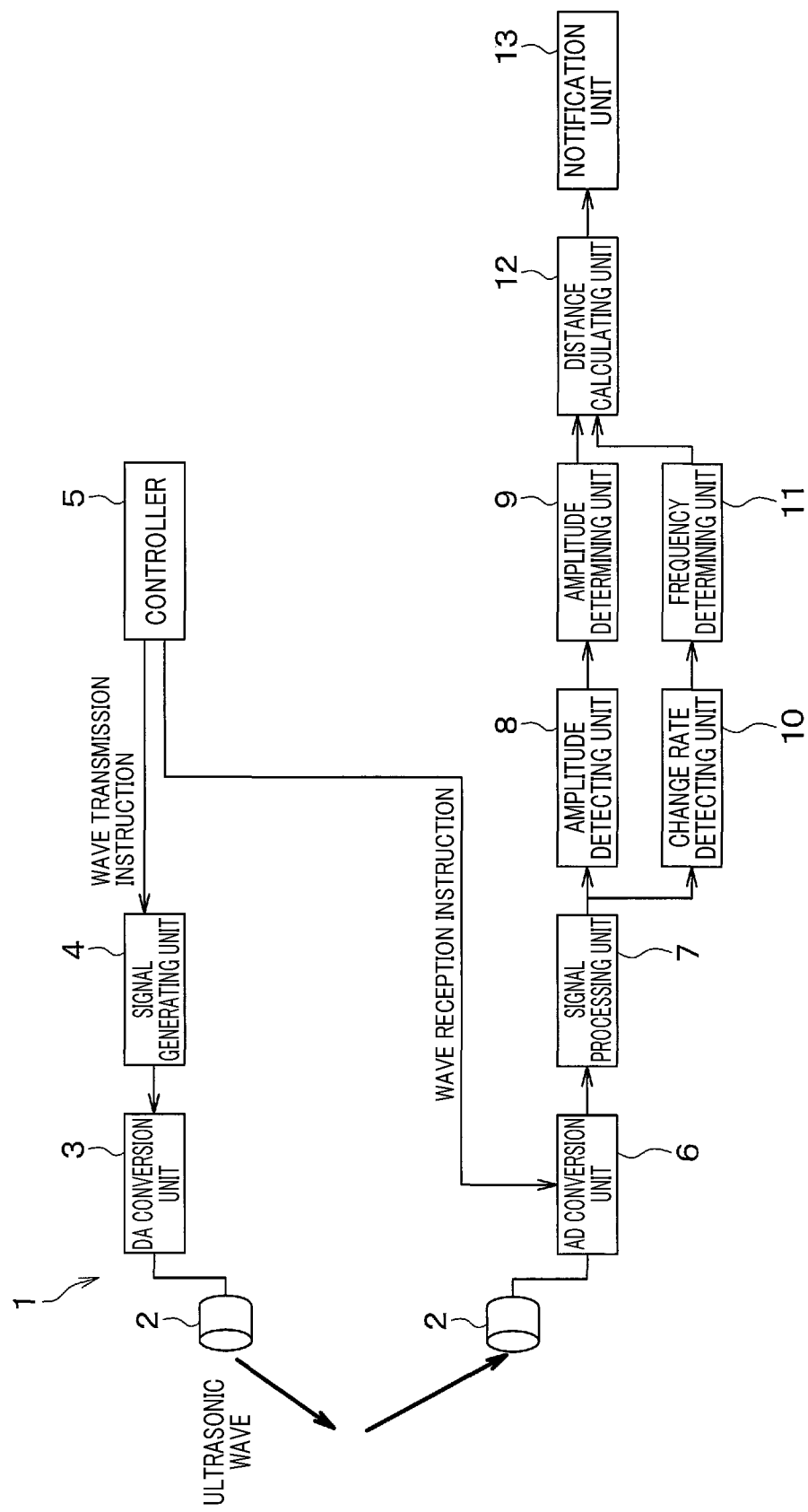
FIG. 28 is a diagram showing an entire configuration of an object detection device according to another embodiment.

In addition, as shown in FIG. 28, two microphones 2 may be used. Specifically, one of the microphones 2 and the DA conversion unit 3 may be used as a transmission unit, while the other microphone 2 may be used as a receiving unit. In addition, although in the first and fourth embodiments, the change rate $\Delta f_p$ of the frequency $f_p$ from start of sweeping to end of sweeping is kept constant, the change rate $\Delta f_p$ may not be fixed. Furthermore, although in the second, third, and fifth embodiments, the change rate of the frequency from start of sweeping to end of sweeping is kept constant for each of the signal SA and the signal SB, the change rate of the frequency may not be fixed.

What is claimed is:

1. An object detection device comprising:
   a signal generating unit that generates a pulse signal of a frequency $f_p$;
   a transmission unit that converts the pulse signal into a probe wave being an ultrasonic wave and transmits the probe wave;
   a receiving unit that receives an ultrasonic wave;
   a distance calculating unit that calculates a distance to an object based on a time from transmission of the probe wave by the transmission unit to reception of a reflected wave of the probe wave by the receiving unit;
   a determination unit that determines whether the ultrasonic wave received by the receiving unit is a reflected wave of the probe wave;
   an amplitude detecting unit that detects an amplitude $A_r$ of the ultrasonic wave received by the receiving unit; and
   a frequency detecting unit that detects a frequency $f_r$ of the ultrasonic wave received by the receiving unit, wherein
   the signal generating unit sweeps the frequency $f_p$ after a predetermined time has elapsed from start of generation of the pulse signal,
   the determination unit determines that the ultrasonic wave received by the receiving unit is a reflected wave of the probe wave when the frequency $f_r$ after the amplitude $A_r$ becomes a predetermined reference value or more from start of transmission of the probe wave by the transmission unit makes the same change as the frequency $f_p$,
   the distance calculating unit, when the determination unit determines that the ultrasonic wave received by the receiving unit is a reflected wave of the probe wave, calculates the distance to the object based on a time from transmission of the probe wave by the transmission unit to reception of the ultrasonic wave by the receiving unit,
   the pulse signal includes a first pulse signal and a second pulse signal,
   the determination unit determines that the ultrasonic wave received by the receiving unit is the reflected wave of the probe wave when the frequency detecting unit detects a plurality of frequencies, and the plurality of frequencies detected by the frequency detecting unit include those making the same change as the frequency of the first pulse signal and those making the same changes as the frequency of the second pulse signal;
   a period of time in which the frequency is swept in the first pulse signal overlaps that in which the frequency is swept in the second pulse signal, and
   the single generating unit starts sweeping of the frequency $f_p$ after generating the pulse signal with the frequency $f_p$ fixed.

2. The object detection device according to claim 1, wherein the signal generating unit starts sweeping of the frequency $f_p$ after generating the pulse signal with the frequency $f_p$ fixed at the same value as the frequency $f_p$ at the start of sweeping.

3. The object detection device according to claim 1, wherein an amount of change per unit time of the frequency $f_p$ from start of sweeping to end of sweeping is kept constant.

4. The object detection device according to claim 1, wherein the signal generating unit starts sweeping of the frequency of the first pulse signal after generating the first pulse signal with the frequency fixed and starts sweeping of the frequency of the second pulse signal after generating the second pulse signal with the frequency fixed.

5. The object detection device according to claim 4, wherein $f_{As} = f_{Be} < f_{Bs} = f_{Ae}$ is satisfied in which:
   $f_{As}$ is a frequency of the first pulse signal from start of signal generation to start of sweeping,
   $f_{Ae}$ is a frequency of the first pulse signal at the end of sweeping,
   $f_{Bs}$ is a frequency of the second pulse signal from start of signal generation to start of sweeping, and
   $f_{Be}$ is a frequency of the second pulse signal at the end of sweeping.

6. The object detection device according to claim 1, wherein the first pulse signal has a frequency at start of sweeping lower than a frequency at the end of sweeping, and the second pulse signal has a frequency at start of sweeping higher than a frequency at the end of sweeping.

7. The object detection device according to claim 6, wherein $f_{A1} < f_{A2}$, $f_{B2} < f_{B1}$, $f_{A1} \leq f_{B3}$, and $f_{A3} \leq f_{B1}$ are satisfied in which
$f_{A1}$ is a frequency of the first pulse signal at start of signal generation,
$f_{A2}$ is a frequency of the first pulse signal at start of sweeping,
$f_{A3}$ is a frequency of the first pulse signal at the end of sweeping,
$f_{B1}$ is a frequency of the second pulse signal at start of signal generation,
$f_{b2}$ is a frequency of the second pulse signal at start of sweeping, and
$f_{B3}$ is a frequency of the second pulse signal at the end of sweeping.

8. The object detection device according to claim 7, wherein $f_{A1} = f_{B3}$ or $f_{A3} = f_{B1}$ is satisfied.

9. The object detection device according to claim 1, wherein a time from start to end of sweeping is different between the first pulse signal and the second pulse signal.

10. The object detection device according to claim 1, wherein a time from start of signal generation to start of sweeping is the same between the first pulse signal and the second pulse signal.

11. The object detection device according to claim 1, wherein a time from start of signal generation to start of sweeping is different between the first pulse signal and the second pulse signal.

12. The object detection device according to claim 1, wherein an amount of change per unit time of a frequency from start of sweeping to the end of sweeping is kept constant in each of the first pulse signal and the second pulse signal.

13. The object detection device according to claim 1, wherein the number of pulses of the pulse signal generated by the signal generating unit from start of generation of the pulse signal to start of sweeping of the frequency $f_p$ is equal to or more than one and equal to or less than ten.

14. An object detection device comprising:
a signal generating unit that generates a pulse signal of a frequency $f_p$;
a transmission unit that converts the pulse signal into a probe wave being an ultrasonic wave and transmits the probe wave;
a receiving unit that receives an ultrasonic wave;
a distance calculating unit that calculates a distance to an object based on a time from transmission of the probe wave by the transmission unit to reception of a reflected wave of the probe wave by the receiving unit;
a determination unit that determines whether an ultrasonic wave received by the receiving unit is a reflected wave of the probe wave;
an amplitude detecting unit that detects an amplitude $A_r$ of the ultrasonic wave received by the receiving unit; and
a frequency detecting unit that detects a frequency $f_r$ of the ultrasonic wave received by the receiving unit, wherein
when an amplitude of the probe wave is defined as $A_t$, the transmission unit has a characteristic that the amplitude $A_t$ has a predetermined reference value $A_{t1}$ or more when the pulse signal is continuously inputted thereinto at a frequency included in a predetermined range,
the signal generating unit generates the pulse signal so that the amplitude $A_t$ has the reference value $A_{t1}$ or more when a predetermined time has elapsed from start of generation of the pulse signal, the signal generating unit also sweeping the frequency $f_p$ from a minimum value to a maximum value or from the maximum value to the minimum value in the predetermined range after the predetermined time has elapsed from start of generation of the pulse signal,
the determination unit determines that the ultrasonic wave received by the receiving unit is a reflected wave of the probe wave when the frequency $f_r$ makes the same change as the frequency $f_p$,
the distance calculating unit, when the determination unit determines that the ultrasonic wave received by the receiving unit is the reflected wave of the probe wave, calculates the distance to the object based on a time from transmission of the probe wave by the transmission unit to reception of the ultrasonic wave by the receiving unit,
the pulse signal includes a first pulse signal and a second pulse signal;
the determination unit determines that the ultrasonic wave received by the receiving unit is the reflected wave of the probe wave when the frequency detecting unit detects a plurality of frequencies, and the plurality of frequencies detected by the frequency detecting unit include those making the same change as the frequency of the first pulse signal and those making the same change as the frequency of the second pulse signal,
a period of time in which the frequency is swept in the first pulse signal overlaps that in which the frequency is swept in the second pulse signal, and
the signal generating unit starts sweeping of the frequency $f_p$ after generating the pulse signal with the frequency $f_p$ fixed.

15. The object detection device according to claim 14, wherein the frequency $f_p$ before start of sweeping is selected to be higher than or equal to the minimum value and lower than or equal to the maximum value of the predetermined range.

16. An object detection device, comprising:
a signal generating unit that generates a pulse signal;
a transmission unit that converts the pulse signal into a probe wave being an ultrasonic wave and transmits the probe wave;
a receiving unit that receives an ultrasonic wave;
a distance calculating unit that calculates a distance to an object based on a time from transmission of the probe wave by the transmission unit to reception of a reflected wave of the probe wave by the receiving unit;
a determination unit that determines whether an ultrasonic wave received by the receiving unit is a reflected wave of the probe wave; and
a frequency detecting unit that detects a frequency of the ultrasonic wave received by the receiving unit, wherein
the pulse signal includes a first pulse signal and a second pulse signal,
the signal generating unit sweeps frequencies of the first pulse signal and the second pulse signal while the transmission unit transmits the probe wave,
$f_{As} < f_{Ae}$, $f_{Be} < f_{Bs}$, $f_{As} < f_{Bs}$, and $f_{Be} < f_{Ae}$ are satisfied when
$f_{As}$ is a frequency of the first pulse signal at start of sweeping, $f_{Ae}$ is a frequency of the first pulse signal at the end of sweeping, $f_{Bs}$ is a frequency of the second pulse signal at start of sweeping, and $f_{Be}$ is a frequency of the second pulse signal at the end of sweeping, the determination unit determines that the ultrasonic wave received by the receiving unit is a reflected wave of the probe wave when the frequency detecting unit detects a plurality of frequencies, and the plurality of frequencies detected by the frequency detecting unit include frequencies making the same change as the frequencies of the first pulse signal and the second pulse signal, the distance calculating unit, when the determination unit determines that an ultrasonic wave received by the receiving unit is a reflected wave of the probe wave, calculates the distance to the object based on a time from transmission of the probe wave by the transmission unit to reception of the ultrasonic wave by the receiving unit, and a period of time in which the frequency is swept in the first pulse signal overlaps that in which the frequency is swept in the second pulse signal.

17. The object detection device according to claim 16, wherein $f_{Ae} \leq f_{Bs}$ or $f_{As} \leq f_{Be}$ is satisfied.

* * * * *